Sept. 3, 1940.  A. BUSKE  2,213,302

JOURNAL BEARING

Filed April 17, 1939

Inventor
Alfred Buske
by Knight Bros
Attys

Patented Sept. 3, 1940

2,213,302

UNITED STATES PATENT OFFICE 2,213,302

JOURNAL BEARING

Alfred Buske, Berlin-Siemensstadt, Germany

Application April 17, 1939, Serial No. 268,193
In Germany March 7, 1938

6 Claims. (Cl. 308—237)

This invention relates to improvements in journal bearings.

Journal bearings are calculated and dimensioned on the assumption that the journal running in the bearing has the form of a straight cylinder so that the pressure and other operating conditions are the same at all points along the bushing. In practice, however, this assumption is not fulfilled, since changes in the relative position of the journal and shaft are unavoidable. Such changes may be caused by inaccuracies of manufacture and above all by deflections of the journal due to stresses occurring in its operation. As a result, outer edge pressures may occur and may exceed the safe limit of the material of the bushing and thus lead to a deterioration or destruction of the bearing. The view has hitherto been held that the above danger could be avoided by rendering the ratio of the length to the diameter smaller or by making the bearing self-adjustable. The shortening of the bearing is only possible within certain limits, whereas the adjustability involves a complicated form of construction and is not at all applicable under certain operating conditions. In such cases it has been considered possible to improve the conditions by imparting a certain resiliency to the bearing housing by reducing the thickness of its wall while securing the proper cross-section by an amply dimensioned flange. However, experience has shown that this does not lead to satisfactory results owing above all to the occurrence of dangerous deformations.

The main object of the present invention is to provide a journal bearing which is free of the above-mentioned disadvantages of the known bearings and which, in particular, eliminates the tendency to develop detrimental outer-edge pressures on the bushing of the bearing even in cases of high speed or other heavy duty.

According to the invention the bushing of the bearing has a higher thermal coefficient of expansion than the bearing housing and the wall thickness of the ends of the housing are equal to or smaller than the thickness of the bushing so that the housing allows the bushing to thermally expand and to conform to the curvature of the deflected shaft. This design renders it possible that upon the occurrence of outer edge journal pressures and of the rise in temperature incidental thereto, the bushing "flares" at its ends, i. e., at the portions where the pressures occur, so that the bushing assumes a bulged shape which as far as possible corresponds to the actual form of the bending of the bearing journal. In contradistinction to the designs hitherto proposed, it is important that no stiffening flanges and the like be provided which might counteract the "flaring" of the bushing.

The invention is especially advantageous if a metal having a low elastic limit is employed for the bushing. In the case of such a material a considerable stress of the material would occur upon the increase in temperature when using the usual forms of construction, so that the material would experience a plastic deformation. If after such a stress the operation is interrupted and the bearing cools down to room temperature, the bushing as a result of the permanent deformation has a smaller outer diaimeter than the bearing housing, i. e., the bushing becomes loose. However, if, according to the invention, the wall of the housing at least at the ends thereof is given such a thickness that, upon the deformation of the bushing and housing caused by the heating of the bearing, the deformative forces occurring between the bushing and the housing are smaller than the forces necessary for a plastic deformation of the bushing, the bushing remains tightly fitted in the housing both in the cold state and in operation.

Both in cases where the outer edge pressures are to be reduced by causing the bushing to deform in a corresponding manner, and in cases where permanent deformations are to be avoided when using a material for the bearing having a high thermal coefficient of expansion, the necessary thicknesses of the bushing and housing may be determined from known equations well known in general for determining the resistance of materials. Thus, for instance, in case the bending of the shaft is to be considered, the following equation holds good:

$$\frac{S_G}{S_B} = \frac{E_B}{E_G}\left(\frac{d}{f}\Delta t.\Delta\alpha - 1\right)$$

where $S_G$ and $S_B$ are the wall thicknesses of the housing and bushing respectively, $E_G$ and $E_B$ are the coefficients of elasticity of the material of the housing and bushing respectively, $d$ is the outer diameter of the bushing, and $f$ is the deflection of the shaft. $\Delta\alpha$ is the difference of the thermal coefficients of expansion, and $\Delta t$ is the change in temperature of the bearing.

Further details of the invention will be apparent from the following description taken in connection with the accompanying drawing, showing longitudinal cross sections through several bearings according to the invention.

Figs. 1, 3, 4 and 6 represent four different embodiments, while

Figure 1:
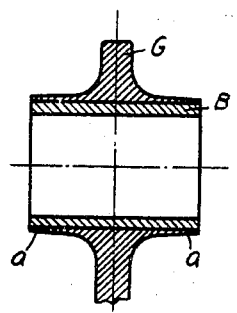

In the embodiment of Fig. 1, a bushing B is tightly fitted into a housing G which comprises an intermediate or central portion forming a thick and rigid rib and lateral cylindrical portions a. The lateral portions are integral with the central rib but have a much smaller thickness which tapers towards the ends of the bearing.

Figure 2:
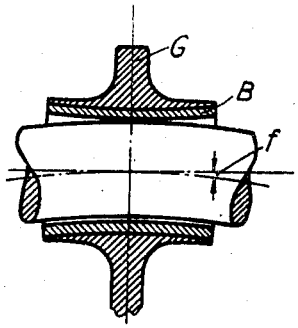
Figs. 2 and 5 are of explanatory nature and show in purposely exaggerated form the bearings of Figs. 1 and 4 respectively when in operative condition.

The ends of these lateral portions do not present any thickening in the form of ribs, flanges or the like so that if the shaft is now deflected by the amount f (Fig. 2) the bearing may deform or as above mentioned "flare" and adapt itself as far as possible to the deflection of the shaft without there occurring any forces which might damage the material.

Figure 3:
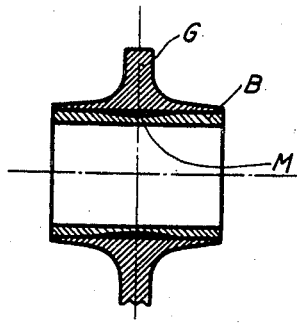

As above stated, a loosening of the bushing in the housing occurs when the elastic limit of the bearing material is exceeded. This may possibly occur in the central zone of a bearing according to Figs. 1 and 2, since the thick central rib offers a considerable resistance to the thermal expansion of the bushing. However, this would in practice be immaterial, for if the material in the zone of the central rib should have experienced a permanent deformation so that the bushing after cooling down is not in direct contact with the housing at some points, the tension between the cooled housing and the end zones of the bushing is sufficiently great to prevent a loosening of the bushing. Furthermore, it is possible to reduce from the very beginning within the zone M the diameter of the bushing as shown in Fig. 3 so that a contact between bushing and housing is brought about in this zone only during deformation in operation.

Figure 6:
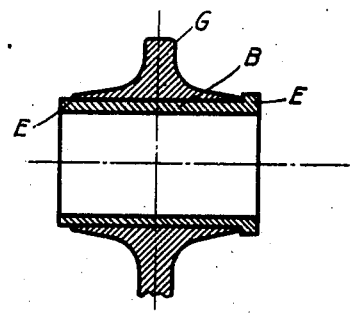

It is not necessary that the bushing and housing be flush at the ends. The form shown in Fig. 6 is also permissible, in which the ends E of the bushing project from the housing laterally or both laterally and radially.

Figure 4:
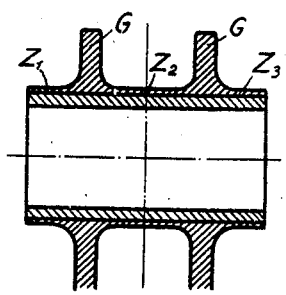
Figure 5:
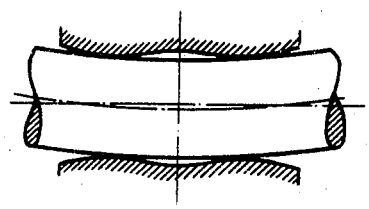

Figs. 4 and 5 show a particular construction of a bearing according to the invention in which the bearing housing is provided with two intermediate ribs G subdividing the portion of the housing which deforms under the influence of heat into three zones $Z_1$, $Z_2$, $Z_3$. Such a bearing deforms in operation as shown in Fig. 5. In this case the advantage exists that the pressure peak in the oil film is removed in the central portion of the bearing so that the entire bearing surface is utilized in a more uniform manner in carrying the load.

The invention may be used in the same manner for bearings with a rotating journal as well as for bearings for reciprocating shafts, and is applicable to one-piece bearings as well as to split bearings.

What is claimed is:

1. In a journal bearing comprising a housing and a bushing fitting said housing, said bushing having a greater thermal coefficient of expansion than said housing, and said housing having an intermediate portion of relatively great thickness and lateral portions at both sides of said intermediate portion and integral therewith, said lateral portions having a smaller thickness so as to be capable of elastic deformation under the forces caused by the thermal expansion of said bushing when the bearing is in operation and of maintaining said deforming forces below those causing a plastic deformation of said bushing.

2. In a journal bearing comprising a housing and a bushing fitting said housing, said bushing having a greater thermal coefficient of expansion than said housing, and said housing having an intermediate portion forming an annular rib-shaped rigid body of relatively great thickness and lateral portions at both sides of said intermediate portion and integral therewith, said lateral portions having a thickness which gradually decreases towards the ends of said housing to such an extent as to be capable of elastic deformation under the forces caused by the thermal expansion of said bushing when the bearing is in operation and of maintaining said deforming forces below those causing a plastic deformation of said bushing.

3. In a journal bearing comprising a housing and a bushing fitting said housing, said bushing having a greater thermal coefficient of expansion than said housing, and said housing having an intermediate rigid portion of relatively great thickness and yielding lateral portions at both sides of said intermediate portion and integral therewith, said lateral portions having a thickness which is smaller than that of said intermediate portion and which near the ends of said bushing is not greater than the thickness of said bushing so as to be capable of elastic deformation under the forces caused by the thermal expansion of said bushing when the bearing is in operation and of maintaining said deforming forces below those causing a plastic deformation of said bushing.

4. In the combination of a shaft with a journal bearing comprising a housing and a bushing tightly fitting said housing and receiving said shaft, said bushing having a greater thermal coefficient of expansion than said housing, and said housing having a rigid intermediate portion of relatively great thickness and lateral portions of relatively small thickness at both sides of said intermediate portion and integral therewith, said lateral portions being elastically yielding so as to permit the ends of said bushing to thermally widen when in operation in order to allow for deformations of said shaft.

5. In a journal bearing comprising a housing and a bushing having a greater thermal coefficient of expansion than said housing, said housing having an intermediate rigid portion of relatively great thickness and yielding lateral portions at both sides of said intermediate portion and integral therewith, said lateral portions having a smaller thickness so as to be capable of elastic deformation under the forces caused by the thermal expansion of said bushing when the bearing is in operation and of maintaining said deforming forces below those causing a plastic deformation of said bushing, said bushing being in tightly fitting contact with said lateral portions of said housing and having an intermediate section forming an interstice with said intermediate portion of said housing when in cold state.

6. In a journal bearing comprising a housing and a bushing fitting said housing, said bushing having a greater thermal coefficient of expansion than said housing, and said housing having two spaced rigid portions of annular shape and relatively great thickness, a central portion between said rigid portions and a lateral portion at the outer side of each rigid portion, said central and lateral portions being integral with said rigid portions and being smaller in thickness to such an extent as to be capable of elastic deformation under the forces caused by the thermal expansion of said bushing when the bearing is in operation.

ALFRED BUSKE.